United States Patent
Knuchel et al.

(10) Patent No.: US 9,744,632 B2
(45) Date of Patent: Aug. 29, 2017

(54) SHAPING OF LINE ENDS

(71) Applicant: SCHLEUNIGER HOLDING AG, Thun (CH)

(72) Inventors: Walter Knuchel, Gruet (CH); Carmelo Messina, Baar (CH); Cyrill Camenzind, Goldau (CH)

(73) Assignee: Schleuniger Holding AG, Thun (CH)

( * ) Notice: Subject to any disclaimer, the term of this patent is extended or adjusted under 35 U.S.C. 154(b) by 261 days.

(21) Appl. No.: 14/253,979

(22) Filed: Apr. 16, 2014

(65) Prior Publication Data

US 2014/0304986 A1 Oct. 16, 2014

(30) Foreign Application Priority Data

Apr. 16, 2013 (EP) .................................... 13164005

(51) Int. Cl.
*B23P 19/00* (2006.01)
*B23Q 3/00* (2006.01)
*H01R 43/28* (2006.01)

(52) U.S. Cl.
CPC ............. *B23Q 3/005* (2013.01); *H01R 43/28* (2013.01); *Y10T 29/49117* (2015.01); *Y10T 29/53261* (2015.01)

(58) Field of Classification Search
CPC .... H01R 43/0585; H01R 24/20; H01R 43/28; Y10T 403/591; Y10T 407/13; Y10T 408/89; Y10T 29/53261

USPC .... 29/759, 240, 243.57, 244, 255, 760, 825, 29/875
See application file for complete search history.

(56) References Cited

U.S. PATENT DOCUMENTS

| 6,324,945 B1 | 12/2001 | Lo et al. |
| 8,967,594 B2 * | 3/2015 | Imgrut ................. H01R 43/005 254/134.3 R |
| 2011/0239437 A1 | 10/2011 | Imgrut |

FOREIGN PATENT DOCUMENTS

| DE | 20301985 U1 | 3/2004 |
| EP | 2372848 A1 | 10/2011 |
| WO | 00/33430 A1 | 6/2000 |

OTHER PUBLICATIONS

EPO search report and written opinion from priority EPO application EP13164005, dated Aug. 27, 2013, in German.

* cited by examiner

*Primary Examiner* — Thiem Phan
(74) *Attorney, Agent, or Firm* — Davis & Bujold PLLC; Michael J. Bujold

(57) ABSTRACT

Aligning machines for individual line ends (2) of cable (3) provide enhanced stress-free and precise alignment of line ends (2) of the cable (3) prior to the further processing thereof. Cable (3) is fixed in a clamp (5) opposite a rotor (4) provided with recesses (6, 7) for the exposed line ends (2). This rotor (4) is provided with a corresponding number of preferably parallel elongate blind holes (7) that connect to funnel-shaped guides (6) for the line ends (2). The rotor (4) and the clamp (5) for the cable (3) are movably mounted relative to one another.

12 Claims, 2 Drawing Sheets

SHAPING OF LINE ENDS

Figure 1:
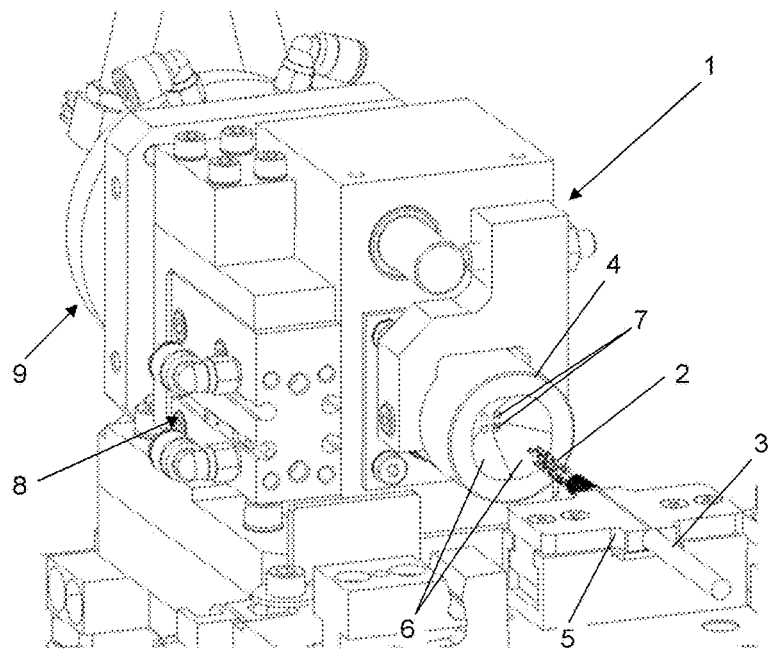

This application claims benefit of priority to prior European (EPO) application no. EP13164005 filed on Apr. 16, 2013 and the entirety of prior European application no. EP13164005 is hereby expressly incorporated herein by reference, in its entirety and as to all its parts, for all intents and purposes, as if set forth identically in full herein.

The present disclosure relates to aligning machines for individual line ends of cables, and also methods for shaping line ends.

Due to the processing of the line ends of cables including a plurality of cores, a precise alignment of the lines for further processing is problematic, as stresses arise in the individual core at the line end. These stresses build up due to the preceding processing (stripping the insulation, shaping, crimping, etc.).

A machine for separating a plurality of cores arranged in cable insulation in a twisted manner is disclosed in DE20301985U1. The free end of the cable insulation is clamped in a first pivotable clamping device, and the cores are clamped into a second clamping device, wherein the clamping device encompasses the cores. After bracing the two clamping devices, the same are pivoted with respect to one another to spread the core strands with respect to one another, and a separating component that is mounted coaxially displaceably and rotatably to the clamped cable runs in-between the spread core strands. A slip-on component subsequently runs over the separating component for laying out and also for aligning the individual cores, before, following the release of the aligned cores from the separating component, a comb-like component, arranged below the separating component, accommodates the cores in the slots thereof. Although here, contiguous or twisted cores are separated by rotating and linear movements, no precise alignment and no shaping arrangement to a defined position of preprocessed lines takes place.

This applies in a similar manner for all conventional machines with a clamping device for the cable and an accommodating component with recesses for the exposed cores. This also applies for methods for shaping line ends, in which a spreading and alignment of the cores of a cable is undertaken.

Within the scope of the present disclosure are therefore enablement of construction of machines, and enablement of effectuation of methods, in such a manner as to enable the reduction of stresses in the line ends of preprocessed cable ends as well as to enable the most precise alignment possible of these line ends.

According to the present disclosure, an aligning machine is characterised in that the accommodating component is provided with a number, corresponding to the number of line ends, of elongate blind holes that connect to funnel-shaped guides for the line ends, which guides taper towards the blind holes, and wherein the accommodating component and/or the clamping device are/is mounted displaceably relatively to one another and coaxially to the longitudinal axis of the clamped cable. Furthermore, in any case, the accommodating component is mounted movably with respect to the clamping device for the cable, with a further degree of freedom lying in a plane perpendicular to the displacement. The term "longitudinal axis of the clamped cable" here should be understood to mean the direction of the axis of the cable in the region of the line ends. Conventionally, this longitudinal axis will also coincide with the longitudinal axis of the cable at the point of the clamping thereof into the clamping device.

With presently described machines, the line ends may be moved in a stress-free manner such that any stresses therein, that were built up therein owing to any type of preprocessing, may be reduced as a result. As a result of freedom from stress present at the line ends at the end of the manipulation carried out with machines according to the present disclosure, these same line ends may be aligned more precisely than was previously possible, thus facilitating the simplification of subsequent processing steps, such as mounting in a connector housing or the like.

Advantageous developments with respect to such machines are also to be drawn from the following description and also the appended drawing figures.

Preferably, the accommodating component is mounted pivotably in a plane, generally perpendicularly to the direction of the clamped cable, preferably rotatably and coaxially relative to the longitudinal axis of the clamped cable. Thus, an optimum result may be achieved in a simple constructive version of the machine.

An advantageous version is characterised in that the accommodating component is mounted displaceably relatively to an essentially fixed clamping device, preferably coaxially to the longitudinal axis of the clamped cable. A secure fixing of the cable is least impaired in the case of the fixed clamping device. Preferably, the blind holes are provided in a predefined geometric arrangement, preferably evenly distributed along a circle around the intersection of the longitudinal axis of the clamped cable with the fixed plane of movement of the accommodating component. The spacing of the elongate blind holes is ideally adapted to the following processing step. For example, the spacings of the blind holes correspond to one of the spacings in the housing to be mounted.

For many instances of post-processing, it may be advantageous if the line ends be aligned in a certain manner with respect to one another, typically so as to be aligned precisely parallel to one another and stress-free. Therefore, an advantageous version provides that the blind holes be arranged in a predefined orientation with respect to one another, preferably to lie parallel to one another.

In order to ensure the unhindered pushing-in of the line ends and the stress-free alignment, the length of the blind holes at least corresponds to the exposed length of the line ends, and preferably, at every depth of the blind holes, the smallest diameter thereof is larger than the largest diameter of the line ends or of the diameter of the connected component on any desired longitudinal section of the line ends. In this case, the term line ends here should be understood to include all additional components attached to the end or in the end region of the core or fixed thereon.

If, according to a preferred version, at least some of the blind holes may be closed and/or the cross section of at least some of the blind holes may be adjusted at least over a portion of the depth thereof, the machine can simply and quickly be adapted for various types of cables and line ends.

Preferably, it is provided that the clamping device and the accommodating component are connected to a control, wherein a process is implemented, according to which, subsequent to the approach of the clamping device to the accommodating component and the consequent pushing-in of the line ends into the blind holes, the accommodating component rotates in such a manner that the same is rotated out of the start position at least once and through a predefined angle in each case in each circumferential direction.

In the context of such methods, steps may be provided, that include the pushing in and stress-free positioning of each line end into a respective one in each case of a number of preferably parallel running blind holes, and the subsequent at least one-time common movement of the line ends about a common first axis by moving the blind holes about a common second axis of the blind holes. These two axes coincide in a preferred version. A further version alternatively or additionally provides that at least one of the axes mentioned also coincides with the longitudinal axis of the clamped cable. Preferably, therefore, the first common axis of the line ends, the second common axis of the blind holes, and the longitudinal axis of the cable coincide in one axis.

Advantageous developments with respect to such methods are also to be drawn from the following description and also the drawing figures.

For method procedure, it may be advantageously provided for a simple and nonetheless effective manipulation of the line ends, that the arrangement of the line ends be rotated at least once about the first axis which first axis runs through the central region between the line ends.

It has been shown to be particularly advantageous with regard to achieving the freedom from stress in particular, to rotate the arrangement of the line ends at least once from the start position through a predefined angle in each of the two circumferential directions.

Preferably, the number and/or the dimensions of the blind holes are adapted in such a manner that the number of blind holes corresponds to the number of the line ends, and the length of the blind holes at least corresponds to the exposed length of the line ends. Furthermore, preferably at every respective depth of the blind holes, the smallest respective diameter thereof is larger than the largest diameter of the line ends at any desired longitudinal section of the line ends.

In this case, it may be particularly advantageous, because it is possible without complex installation operations on the machine, if the adaptation of the number and/or the dimensions of the blind holes includes the selection and equipping of the aligning machine with an accommodating component having the desired number and the desired dimensions of the blind holes. In this context, equipping should be understood to mean all activities to set up the machine for the execution of the method according to the invention, for example to furnish the same with the necessary accommodating component and, if appropriate, with an adapted clamping device.

Alternatively, a realization of the adaptation of the number and/or the dimensions of the blind holes by opening or closing or by adapting the cross section of the blind holes in the accommodating component, may also be provided.

Further advantages, features and details according to the present disclosure shall be apparent from the following description, in which some exemplary versions of the invention are described with reference to the drawings. Some exemplary possible realizations of apparatus and method according to the present disclosure may be understood in greater detail on the basis of the attached drawings and accompanying description, without restricting the claimed scope of protection to specific exemplary disclosure.

The appended reference labels list is part of the disclosure. The figures are described in a cohesive and comprehensive manner. The same reference symbols denote the same components, and any reference symbols with different indices specify functionally identical or similar components.

Figure 2:
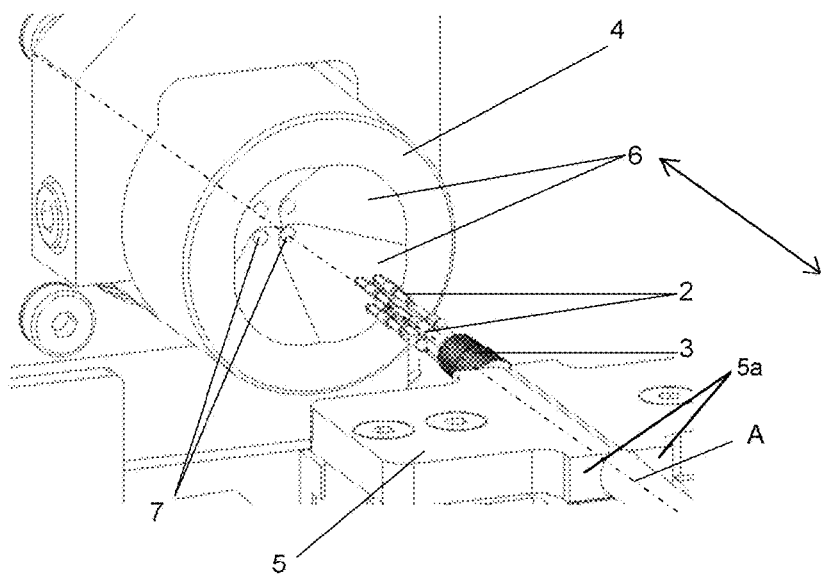
Figure 3:
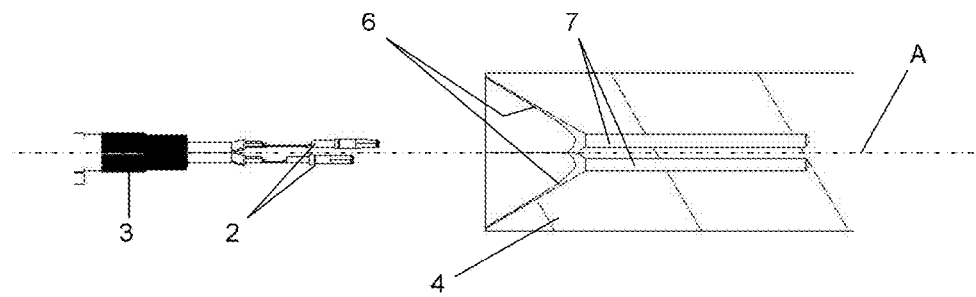
Figure 4:
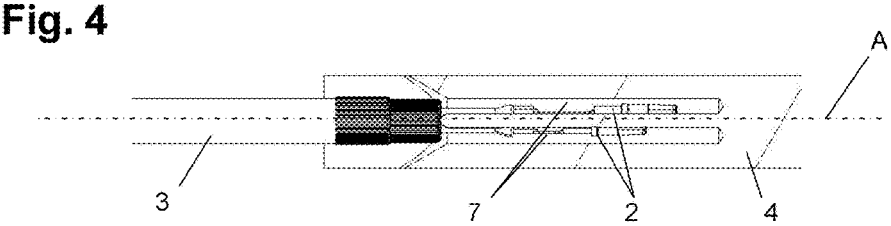
Figure 5:
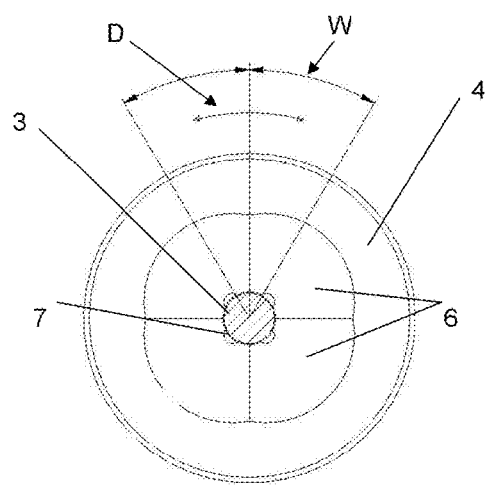

In the drawings:

FIG. 1—shows an exemplary embodiment of an aligning machine according to the invention in a view from the front and above;

FIG. 2—shows an enlarged cutout of FIG. 1, in which the front end of the accommodating component can more clearly be seen;

FIG. 3—shows a longitudinal section through an accommodating component with line ends spaced from the same at the end of a cable;

FIG. 4—shows a longitudinal section according to FIG. 3, but this time with line ends pushed into the accommodating component for aligning and stress reduction; and, FIG. 5 shows a front view of the accommodating component of FIGS. 3 and 4 with indication of the direction and the angle of the rotation thereof.

In the present description, numerous specific details are set forth in order to provide a thorough understanding of versions of the present invention. It will be apparent, however, to one skilled in the art, that some versions of the present invention may be practiced without some of these specific details. Indeed, reference in this specification to "one/the version," "a version," "versions," "a variant," "variants," and "one/the variant," should be understood to mean that a particular feature, structure, or characteristic described in connection with the version or variant is included in at least one such version or variant of the disclosure. Thus, the appearances of phrases such as "in one version," "in one variant," and the like, in various places in the specification are not necessarily all referring to the same variant or version, nor are separate or alternative versions or variants mutually exclusive of other versions or variants. Moreover, various features are described which may be exhibited by some versions or variants and not by others. Similarly, various requirements are described which may be requirements for some versions or variants, but not others. Furthermore, as used throughout this specification, the terms 'a', 'an', 'at least' do not denote a limitation of quantity, but rather denote the presence of at least one of the referenced item, in the sense that singular reference of an element does not necessarily exclude the plural reference of such elements. Concurrently, the term "a plurality" denotes the presence of more than one referenced items. Finally, the terms "connected" or "coupled" and related terms are used in an operational sense and are not necessarily limited to a direct connection or coupling.

FIG. 1 shows an exemplary processing station for cables, with an aligning machine 1. Using such processing station 1, two-to-four line ends 2 of a cable 3 may be aligned in a stress-free manner, and parallel, for the further processing of the cable 3 or of the line ends 2 thereof. However, cables 3 with yet more cores may also be processed, depending on the configuration of the accommodating component 4 of an aligning machine 1.

Considering FIGS. 1-2, in a region adjoining the line ends 2, where the cable 3 is also provided with the sheath, insulation, jacket, etc. thereof, the cable 3 itself is clamped in a clamp 5 by grippers 5a, as depicted, so as to be rotationally fixed about its longitudinal axis A. The cable 3 is also fixed against translation in the direction of the same longitudinal axis A.

The accommodating component, rotor 4, being opposite the line ends 2 has a guide 6, or, in the present case, a plurality of guides 6, that open towards the line ends 2. Blind holes 7 adjoin the ends of the/each guide 6 opposite the line ends 2. The number of blind holes 7 corresponds to the number of line ends 2 to be aligned. These elongate blind holes 7 are aligned parallel to one another.

The blind holes 7 may be present in a predefined geometric arrangement, that corresponds to the desired arrangement of the line ends 2 for the further processing of the cable 3. Preferably, the blind holes 7 may be distributed evenly (see FIG. 5) along the circumference of a circle around the intersection of the longitudinal axis A (see the explanation in the present description introduction, in this regard) of the clamped cable 3 with the fixed plane, which plane is typically defined by the openings of the blind holes 7.

The length of the blind holes 7 at least corresponds to the exposed length of the line ends 2, so that the same may be pushed completely into the blind holes 7. Furthermore, in order to ensure the stress-free arrangement of the line ends 2 in the rotor 4, at every depth of the blind holes 7, the smallest diameter thereof is larger than the largest diameter of the line ends 2 at any desired longitudinal section of the same line ends 2. In this case, of course all components or elements, that are (if appropriate) fixed on the line ends 2, or otherwise connected thereto, must also be taken into account. The line ends 2 are generally not fixed in the blind holes 7. If there is a risk of damage to the connected components, or if the same are very complex with regards to the shape thereof, a fixing of the line ends 2 in the blind holes 7 may be necessary in order to effect the desired alignment of the line ends 2.

The blind holes 7 may, in any case, be realized as a stepped bore, but in every case, the diameters in every region of the blind hole 7 are larger than the diameter of the line end 2 or each component connected thereto, for example a pressed-on contact.

In order to be able to push the line ends 2 into the blind holes 7, the rotor 4 and the clamp 5 are mounted displaceably relative to one another and coaxially to the longitudinal axis A of the clamped cable 3. Usually in this case, the rotor 4 is preferably controllably displaceable by action of an electrical, hydraulic, pneumatic or other drive mechanism 8 in the direction towards the clamp 5 and away from the same. If appropriate, alternatively the clamp 5 alone may be movably mounted, or, both components 4,5, may be movably mounted, as indicated by arrow in FIG. 2.

In any case, the rotor 4 is movable in a plane perpendicularly to the direction of the clamped cable 3, wherein this movement is preferably a rotation coaxially to the direction or the longitudinal axis A of the clamped cable 3. This rotational movement may be effected by means of an electrical, pneumatic, hydraulic or other drive 9. The movement of the rotor 4, which could in any case also be a movement about a pivot point lying outside the rotor 4, takes place in an essentially fixed plane, preferably parallel to the plane defined by the openings of the blind holes 7.

Some or all of the blind holes 7 may be closable, particularly in order to facilitate the processing of cables 3, where the number of line ends 2 to be aligned is smaller than the number of blind holes 7 present overall. In order to configure an aligning machine according to the present disclosure, to process various cable types, particularly also with respect to the cross section of the line ends 2, the cross section of at least some of the blind holes 7 may be adjustable at least over a portion of the depth thereof. Typically, however, the aligning machine is adapted to a particular cable type, so that an adaptation, adjustment or even, in principle, a possible exchange of the rotor 4 is not necessary.

For controlling the processes during the alignment and the stress reduction in the line ends 2, the clamp 5 and the rotor 4 are in operative communication with a control (not illustrated), in each case. Hard-wired in this control, a process is implemented, realized via printed circuits or via software, in accordance with which process, the following steps are typically effected: Subsequently to the approach of the rotor 4 to the clamp 5—with the pushing in of the line ends 2 into the blind holes 7 of the rotor 4—the rotor 4 is set rotating in such a manner. In this case, the rotor 4 is rotated out of a start position at least once through a predetermined angle in each one of the two circumferential directions (see FIG. 5 indications in this regard).

Subsequently, the method for shaping line ends 2, particularly for the precise and parallel alignment with simultaneous dissipation of all stresses in the line ends 2, shall now be further described. It proceeds from the spreading and alignment of the cores of the cable 3.

The line ends 2 are brought from a starting position (illustrated in FIG. 3), first into the region of the guides 6 of the rotor 4, via relative movement with respect to one another of the rotor 4 and the clamp 5, the clamp 5 having cable 3 fixed therein. Upon continuation of the relative movement of rotor 4 and clamp 5, the line ends 2, guided by the guides 6, are pushed further into the preferably parallel blind holes 7, as depicted in FIG. 4. There, the line ends 2 are positioned in a stress-free manner, more particularly not clamped nor otherwise actively loaded with any significant forces that could lead to stresses in the line ends 2.

In this position of the line ends 2 in the blind holes 7, the rotor 4 is set moving in a plane perpendicular to the axes of the line ends 2, preferably set rotating about a first axis lying between the line ends 2. To this end, the rotor 4 is rotated about a second axis, preferably the common axis of the blind holes 7, to accommodate the line ends 2. In the illustrated version of the machine, both axes, first and second, do coincide with the longitudinal axis A of the cable 3 fixed in the clamp 5. Thus typically, the arrangement of the line ends 2 may therefore be rotated at least once about an essentially common axis lying centrally between the line ends 2. Preferably, and also indicated in FIG. 5 by means of the directional arrows D, the arrangement of the line ends 2 is rotated from a start position at least once in each of the two opposing directions. By means of such rotating or oscillating movement for example about the longitudinal axis of the cable 3 to the right and left from the start position through a certain, yet variable angle; and with a certain, yet variable number of cycles, these line ends 2 are relieved from the stresses thereof.

The angle W of the rotation D may preferably be chosen in such a manner that all stresses are dissipated from the line ends 2, but so that the line ends 2 are not damaged within the blind holes 7 or at the edges of the openings thereof. The angle W of the rotation will in this case be smaller than 90°, preferably smaller than 45°, preferably approximately 30°. Particularly good results for the dissipation of stresses were achieved in the case of repeated rotation D in each direction. Particularly beneficial in this case are two to ten rotations in each circumferential direction, in each case. In the context of trials on prototypes, very good results were achieved with an angle of approx. 30° and an eight-time repetition of reciprocating movement.

It should be understood also that the angle W of the rotation may also vary for each rotation. Thus, for example, variant method procedures are possible, in which the angle W decreases from the first to the last rotation (for example the first rotation takes place through an angle of approx. 30°, the second rotation through a smaller angle of approx. 20°, followed by one or a plurality of terminating rotations through only approx. 10°). Likewise the angle W may even possibly controllably increase. Such processes may be realised particularly easily with an electrical drive 9 acting as the rotational drive 9 of the rotor 4.

For the most part, the aligning machines for certain cable types are assembled and then remain essentially unchanged. On the other hand, an aligning machine could also be flexibly adjustable to different kinds and types of cables.

Then, the method according to the present disclosure also includes the equipping or adapting phase for the particular cable respectively arriving for processing.

This may, for example, take place by an adaptation of the number and/or the dimensions of the blind holes 7, so that the number thereof corresponds to the number of line ends 2, and so that the length thereof at least corresponds to the exposed length of the line ends 2. Also, at every depth of the blind holes 7, the smallest diameter thereof must be larger than the largest diameter of the line ends 2 at any desired longitudinal section of the same line ends 2.

Such adaptation may take place via either the installation or connection of accommodating components 4 that have the corresponding number and the corresponding dimensions of the blind holes 7. Adaptations also may, however, alternatively take place by adapting the number and/or the dimensions of the blind holes 7 via manual or automatic opening or closing of the blind holes 7 in the rotor 4. A further alternative measure would, for example, be an adaptation of the cross section of the blind holes 7 in the accommodating component 4. In the latter case, this adaptation may be preceded by preferably automatic identification of the cable type via suitable sensors cooperating with the control unit.

Finally, it should be noted that the term "comprising" does not exclude other elements or features, and that use of the terms "a" or "an" does not necessarily exclude a plurality, in the sense that singular reference of an element does not exclude the plural reference of such elements. The verb 'comprise' and its conjugations do not exclude the presence of elements or steps other than those listed in any claim or the specification as a whole. The mere fact that certain measures are recited in mutually different dependent claims does not indicate that a combination of these measures cannot possibly be used to advantage. Furthermore, elements described in association with different versions may be combined. Finally, it should be noted that the abovementioned examples, and versions illustrate rather than limit the invention, and that those skilled in the art will be capable of designing many alternative implementations without departing from the scope of the invention as defined by the appended claims. As equivalent elements may be substituted for elements employed in claimed invention to obtain substantially the same results in substantially the same way, the scope of the present invention is defined by the appended claims, including known equivalents and unforeseeable equivalents at the time of filing of this application. Thus, in closing, it should be noted that the invention is not limited to the abovementioned versions and exemplary working examples. Further developments, modifications and combinations are also within the scope of the appended patent claims and are placed in the possession of the person skilled in the art from the present disclosure. Accordingly, the techniques and structures described and illustrated previously herein should be understood to be illustrative and exemplary, and not necessarily limiting upon the scope.

REFERENCE LABELS LIST

1 Aligning machine
2 Line ends
3 Cable
4 Accommodating component as rotor
5 Clamping device/clamp for cable
5a Grippers
6 Guide
7 Blind hole
8 Drive for accommodating component, translational
9 Drive for accommodating component, rotational
A Longitudinal axis of the cable
D Direction of rotation
W Angular range (arc) of the rotation

What is claimed is:

1. An aligning machine comprising:
    a rotor, said rotor being rotatable on a first axis, said rotor having a forward face;
    a drive motor connected to controllably rotate said rotor;
    a plurality of recesses in said rotor forward face, each of said plurality of recesses including at least one respective funnel-like guide;
    said plurality of funnel-like guides tapering towards a plurality of blind holes, and the each of the plurality of blind holes having an inner diameter and being located in said rotor;
    each of said plurality of blind holes being configured to receive a line end of a cable and said each blind hole having a length at least as long as a length of an exposed length of the line end and the inner diameter of each blind hole being dimensioned to accommodate a corresponding line end including an attached component;
    a clamp, said clamp having a clamping axis, said clamp having grippers configured to clamp cable passed on the clamping axis through said clamp and towards said rotor face; and,
    a drive, said drive connected to controllably adjust relative distance separating said rotor and said clamp on the clamping axis.

2. An aligning machine as claimed in claim 1, further comprising:
    a rotor mount supporting said rotor for rotation in a plane transverse to said clamping axis.

3. The aligning machine as claimed in claim 1, wherein: said first axis is parallel to said clamping axis.

4. The aligning machine as claimed in claim 1, wherein: said first axis is coincident with said clamping axis.

5. An aligning machine as claimed in claim 1, further comprising:
    a rotor mount supporting said rotor for displacement along said clamping axis.

6. The aligning machine as claimed in claim 5, wherein: said drive is connected to controllably translate said rotor along said clamping axis.

7. The aligning machine as claimed in claim 1, wherein: said plurality of blind holes are provided evenly distributed around said rotor and along a circle around said clamping axis.

8. The aligning machine as claimed in claim 1, wherein: said plurality of blind holes are arranged in a predefined orientation with respect to one another.

9. The aligning machine as claimed in claim 8, wherein: said plurality of blind holes are arranged parallel to one another.

10. The aligning machine of claim 1, wherein the number of blind holes corresponds to the number of line ends in the cable.

11. The aligning machine of claim 10, wherein the number of blind holes corresponding to the number of line ends is accomplished by closing some of the plurality of blind holes present in the rotor.

12. The aligning machine of claim 10, wherein each blind hole has a stepped bore to accommodate the component attached to the corresponding line end.

* * * * *